US 8,254,000 B2

(12) United States Patent
Roscoe et al.

(10) Patent No.: US 8,254,000 B2
(45) Date of Patent: Aug. 28, 2012

(54) MATCHING PRINTER CUSTOM TARGET COLORS USING IN-LINE SPECTROPHOTOMETER

(75) Inventors: Gary Roscoe, Fairport, NY (US); Jeffrey Gramowski, Chili, NY (US)

(73) Assignee: Xerox Corporation, Norwalk, CT (US)

( * ) Notice: Subject to any disclaimer, the term of this patent is extended or adjusted under 35 U.S.C. 154(b) by 969 days.

(21) Appl. No.: 12/255,712

(22) Filed: Oct. 22, 2008

(65) Prior Publication Data
US 2010/0097669 A1  Apr. 22, 2010

(51) Int. Cl.
*G03F 3/08* (2006.01)
*H04N 1/60* (2006.01)
*G06K 9/00* (2006.01)

(52) U.S. Cl. .......................... 358/518; 358/1.9; 382/167
(58) Field of Classification Search .................... 358/1.9, 358/504, 505, 416, 518, 526; 382/167, 165, 382/162; 702/85, 108, 127
See application file for complete search history.

(56) References Cited

U.S. PATENT DOCUMENTS

| | | | | |
|---|---|---|---|---|
| 5,339,176 | A * | 8/1994 | Smilansky et al. ............ | 358/504 |
| 6,032,004 | A | 2/2000 | Mirabella, Jr. et al. | |
| 6,404,517 | B1 * | 6/2002 | Chao ................................ | 358/504 |
| 6,538,770 | B1 * | 3/2003 | Mestha ............................ | 358/1.9 |
| 6,791,716 | B1 * | 9/2004 | Buhr et al. ...................... | 358/1.9 |
| 7,069,164 | B2 * | 6/2006 | Viturro et al. ................... | 702/85 |
| 7,151,547 | B2 | 12/2006 | Lin et al. | |
| 7,271,910 | B2 * | 9/2007 | Paul et al. ........................ | 356/406 |
| 7,307,752 | B1 * | 12/2007 | Mestha et al. ................... | 358/1.9 |
| 7,835,036 | B2 * | 11/2010 | Mestha et al. ................... | 358/3.24 |
| 7,961,321 | B2 * | 6/2011 | Bonikowski et al. .......... | 356/402 |
| 8,014,024 | B2 * | 9/2011 | Viturro et al. ................... | 358/1.9 |
| 2003/0053103 | A1 * | 3/2003 | Patton .......................... | 358/1.13 |
| 2003/0055611 | A1 * | 3/2003 | Mestha et al. ................. | 702/196 |
| 2003/0098986 | A1 * | 5/2003 | Pop ................................. | 358/1.9 |
| 2004/0012817 | A1 * | 1/2004 | Brewington et al. ........ | 358/3.06 |
| 2004/0042022 | A1 * | 3/2004 | Friedman et al. .............. | 358/1.9 |
| 2004/0078299 | A1 * | 4/2004 | Down-Logan et al. ......... | 705/27 |
| 2004/0114157 | A1 * | 6/2004 | Linder et al. ................... | 358/1.9 |
| 2004/0150848 | A1 * | 8/2004 | Delang et al. .................. | 358/1.9 |
| 2005/0094170 | A1 * | 5/2005 | Ichitani ........................... | 358/1.9 |
| 2006/0028699 | A1 * | 2/2006 | Venable et al. ................. | 358/504 |
| 2006/0077407 | A1 * | 4/2006 | Tanaka ............................ | 358/1.9 |
| 2006/0126133 | A1 * | 6/2006 | Marquez ........................ | 358/504 |
| 2006/0132787 | A1 * | 6/2006 | Mestha et al. ................. | 356/454 |
| 2006/0132815 | A1 * | 6/2006 | Lofthus et al. ................. | 358/1.13 |
| 2006/0156232 | A1 | 7/2006 | Giannetti et al. | |
| 2006/0176526 | A1 * | 8/2006 | Iannazzi ......................... | 358/504 |
| 2006/0193017 | A1 * | 8/2006 | Zuber ............................. | 358/504 |
| 2006/0197966 | A1 * | 9/2006 | Viturro et al. .................. | 358/1.9 |

(Continued)

*Primary Examiner* — Madelein A Nguyen
(74) *Attorney, Agent, or Firm* — Gibb & Riley, LLC

(57) ABSTRACT

A method and system scan an item having at least one color feature using an in-line spectrophotometer of a printing apparatus. The scanning identifies at least one "item color" within the color feature. The item color is stored as at least one custom target color in a computer-readable storage medium of the printing apparatus. The custom target color can be stored with the print job for future reference. At least one print job is processed through a printing engine of the printing apparatus to output at least one printed sheet. During the processing of the print job, the printed sheet is scanned with the in-line spectrophotometer to identify at least one printed color on the printed sheet and the printed color is compared to the custom target color to identify any color difference. The printing characteristics of the printing apparatus are adjusted to reduce the color difference.

12 Claims, 2 Drawing Sheets

U.S. PATENT DOCUMENTS

| | | |
|---|---|---|
| 2006/0221341 A1* | 10/2006 | Paul et al. .................... 356/406 |
| 2006/0238778 A1* | 10/2006 | Mongeon et al. .............. 358/1.4 |
| 2007/0051161 A1* | 3/2007 | Friedman et al. ................ 73/10 |
| 2007/0203905 A1* | 8/2007 | Mestha et al. .................... 707/5 |
| 2008/0043263 A1* | 2/2008 | Hancock et al. ............... 358/1.9 |
| 2008/0225309 A1 | 9/2008 | Hosier |
| 2008/0291479 A1* | 11/2008 | Mestha et al. ................. 358/1.9 |
| 2009/0033970 A1* | 2/2009 | Bray et al. ................... 358/1.13 |
| 2009/0296112 A1* | 12/2009 | Gil et al. ........................ 358/1.9 |
| 2009/0296175 A1* | 12/2009 | Conrow et al. ............... 358/534 |
| 2009/0299905 A1* | 12/2009 | Mestha et al. ................... 705/76 |
| 2010/0045987 A1* | 2/2010 | Bonikowski et al. ......... 356/402 |
| 2010/0046013 A1* | 2/2010 | Bonikowski et al. ......... 358/1.9 |
| 2010/0092083 A1* | 4/2010 | Herloski et al. .............. 382/168 |
| 2010/0202005 A1* | 8/2010 | Viturro et al. .................. 358/1.9 |
| 2011/0286019 A1* | 11/2011 | Honeck et al. ................ 358/1.9 |

* cited by examiner

MATCHING PRINTER CUSTOM TARGET COLORS USING IN-LINE SPECTROPHOTOMETER

Embodiments herein generally relate to electrostatographic printers and copiers or reproduction machines, and more particularly, concern method and apparatuses for scanning an item using an in-line spectrophotometer of a printing apparatus to identify an item color and store the item color as a custom target color in a computer-readable storage medium of the printing apparatus.

BACKGROUND AND SUMMARY

In the printing market (especially in the color market) print quality matching is very important. Some printers use devices in the paper path to measure the color consistency of the printed image against target values for the color. Such devices, however, may not provide a solution if the customer just wants to match a pre-existing print, or if the print shop wants to match another printer that is running in their shop.

When multi-color printing devices are designed and manufactured, pre-established (preset) target colors are defined for each printing device to allow the printing devices to be initially calibrated (and potentially recalibrated during use in the field by field service personnel or automatically). The operating parameters of the printing device are adjusted until the printed output matches such preset target colors. Such calibration using preset target colors ensures that all printing devices manufactured according to a specific design will perform similarly. In other words, during manufacturing, printing devices can be tuned to match preset target colors to ensure that all similarly designed devices perform up to design expectations.

Further, some advance printing devices include the ability to automatically scan the printed output and periodically adjust their various operating parameters so that the printed output matches the preset target colors. This allows such printing devices to consistently maintain the quality standards they had when they were new.

The embodiments herein allow the customer or service representative to run a pre-printed target sheet through the system. As the target sheet goes through the system, the printer reads the color of the target sheet. The colors from the target sheet will be stored as custom target colors for the printer. Once the custom target colors are set, any subsequent printed sheets can be calibrated to the custom target colors from the target sheet.

The embodiments herein do more than just match the output colors to preset target colors for the printer itself and, instead, the embodiments herein dynamically reset the target colors maintained by the printing device to the color of an item scanned by a user. Therefore, the dynamic custom target colors used by embodiments herein are different than the static preset target colors initially established during the design of the printing apparatus. Instead, the embodiments herein cause the printing apparatus to conform to the scanned item and to ignore its preset target colors. Therefore, embodiments herein allow one printer to visually match the output of a different class, type, or brand of printer.

More specifically, method embodiments herein scan an item having at least one color feature (e.g., a color image on a sheet of media, a physical item having a specific color, or any other item physically capable of being scanned) using an in-line spectrophotometer of the printing apparatus. The scanning identifies at least one "item color" within the color feature. The embodiments herein store the item color as at least one custom target color in a computer-readable storage medium of the printing apparatus. The custom target color can be stored with the print job for future reference.

At least one print job is processed through a printing engine of the printing apparatus to output at least one printed sheet. During the processing of the print job, the printed sheet is scanned with the in-line spectrophotometer to identify at least one printed color on the printed sheet and the printed color is compared to the custom target color to identify a color difference. Thus, during the processing of the print job, the embodiments herein can adjust printing characteristics of the printing apparatus to reduce the color difference and thereby output a print job that precisely satisfies the customer's color requirements.

Device/system embodiments herein utilize a processor within a printing apparatus. An in-line spectrophotometer that comprises an integral part of the printing apparatus is operatively connected to the processor. The in-line spectrophotometer scans the item that has the color feature to identify the item color. A computer-readable storage medium, that is operatively connected to the processor, stores the item color as the custom target color. The computer-readable storage medium can also store the custom target color with the print job for future reference and can send the print job and custom target color(s) to other similar printers to allow the job to be processed across multiple printers.

The printing apparatus includes a printing engine (again, operatively connected to the processor). The printing engine processes at least one print job to output at least one printed sheet. The sheet path of the printing apparatus is also operatively connected to the processor. The sheet path directs the printed sheet to the in-line spectrophotometer to identify at least one printed color on the printed sheet. The processor compares the printed color(s) to the custom target color(s) to identify a color difference, and the processor adjusts printing characteristics of the printing apparatus to reduce such color difference. Once the printing apparatus properly matches the custom target colors for a given print job, the print job is output to a sheet output (operatively connected to the end of the sheet path).

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
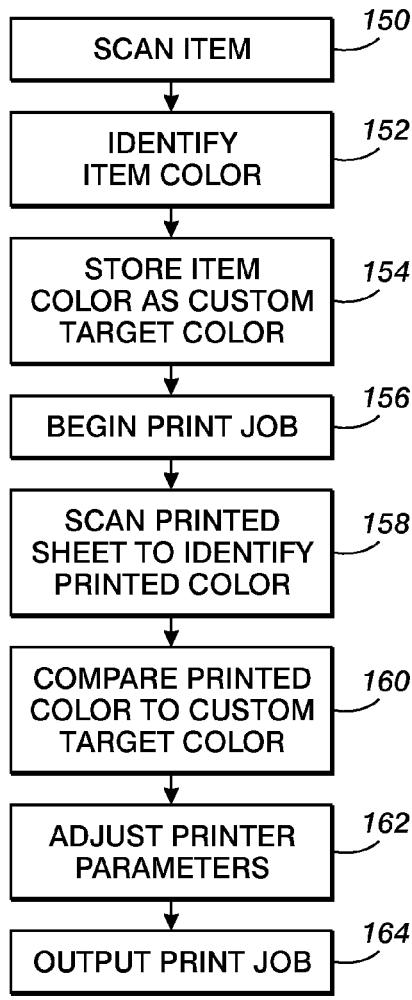
FIG. 1 is a flow diagram of method embodiments herein.

As mentioned above, when multi-color printing devices are designed and manufactured, pre-established (preset) target colors are defined for each printing device to allow the printing devices to be initially calibrated (and potentially recalibrated during use in the field by field service personnel or automatically). The operating parameters of the printing device are adjusted until the printed output matches such preset target colors. Such calibration using preset target colors ensures that all printing devices manufactured according to a specific design will perform similarly. In other words, during manufacturing, printing devices can be tuned to match preset target colors to ensure that all similarly designed devices perform up to design expectations.

Further, some advance printing devices include the ability to automatically scan the printed output and periodically adjust their various operating parameters so that the printed output matches the preset target colors. For example, see U.S. Patent Publication 2008/0225309 (the complete disclosure of which is incorporated herein by reference) which disclose an in-line spectrophotometer. In U.S. Patent Publication 2008/0225309 a print engine prints out a test image. Once the test print is created, the actual values of the various color test patches in the test print are measured by the spectrophotometer and the resulting color data, i.e., the actual color of each color area is determined in color space, is compared to data relating to the preset target color of the test patch. The difference in color space between the target color and the actual color for each test patch is then used to calibrate the printer for future prints. This allows such printing devices to consistently maintain the quality standards they had when they were new.

However, sometimes such preset target colors do not meet customer expectations because the precise colors demanded by customers may not exactly match the preset target colors. For example, it is common for a customer to desire the output of a first printer to exactly match a printed sheet produced by a different class, type, or brand of printer. However, if the different printer was calibrated according to a completely different set of preset target colors than was the first printer, the first printer will not be able to match the output of the different printer very closely. Therefore, such preset target colors are useful in maintaining color standards for which the printing device was designed; however, such preset colors may not meet constantly changing customer demands.

To address this situation, the embodiments herein do more than just match the output colors to preset target colors for the printer itself and, instead, the embodiments herein dynamically reset the target colors maintained by the printing device to the color of an item scanned by a user. Therefore, the dynamic custom target colors used by embodiments herein are different than the static preset target colors initially established during the design of the printing apparatus. Instead, the embodiments herein cause the printing apparatus to conform to the scanned item and to ignore its preset target colors. Therefore, embodiments herein allow one printer to visually match the output of a different class, type, or brand of printer.

More specifically, as shown in flowchart form in FIG. 1, one method embodiment herein scans an item having at least one color feature in item 150 (e.g., a color image on a sheet of media, a physical item having a specific color, or any other item physically capable of being scanned) using an in-line spectrophotometer of the printing apparatus. The scanning identifies at least one "item color" within the color feature, in item 152. The embodiments herein store the item color as at least one custom target color in a computer-readable storage medium of the printing apparatus in item 154. The custom target color can be stored with the print job for future reference, if desired.

At least one print job is started through a printing engine of the printing apparatus to output at least one printed sheet in item 156. During the processing of the print job, the printed sheet is scanned with the in-line spectrophotometer to identify at least one printed color on the printed sheet in item 158. The printed color is compared to the custom target color to identify a color difference in item 160. Thus, during the processing of the print job, the embodiments herein can adjust printing characteristics of the printing apparatus (item 162) to reduce the color difference and thereby output a print job (item 164) that precisely satisfies the customer's color requirements.

With embodiments herein, a print engine can match the output of another printer, jobs can be split across multiple printers, and offset print presses could use the output of digital printers/copiers as proof machines. Further, the custom target colors can be stored and attached to specific jobs for future reproduction.

Figure 2:
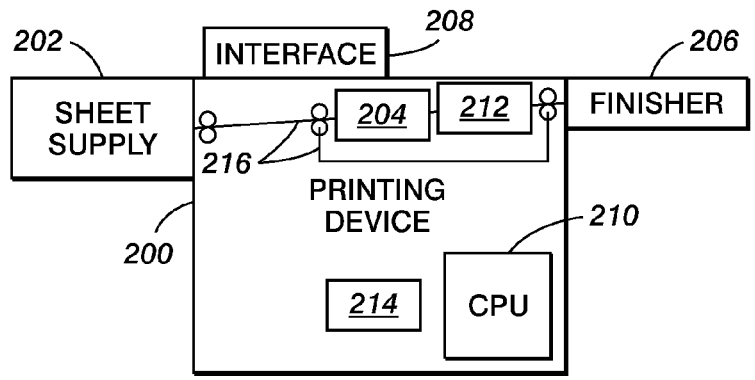
FIG. 2 is a schematic diagram of a printing device according to embodiments herein.
Figure 3:
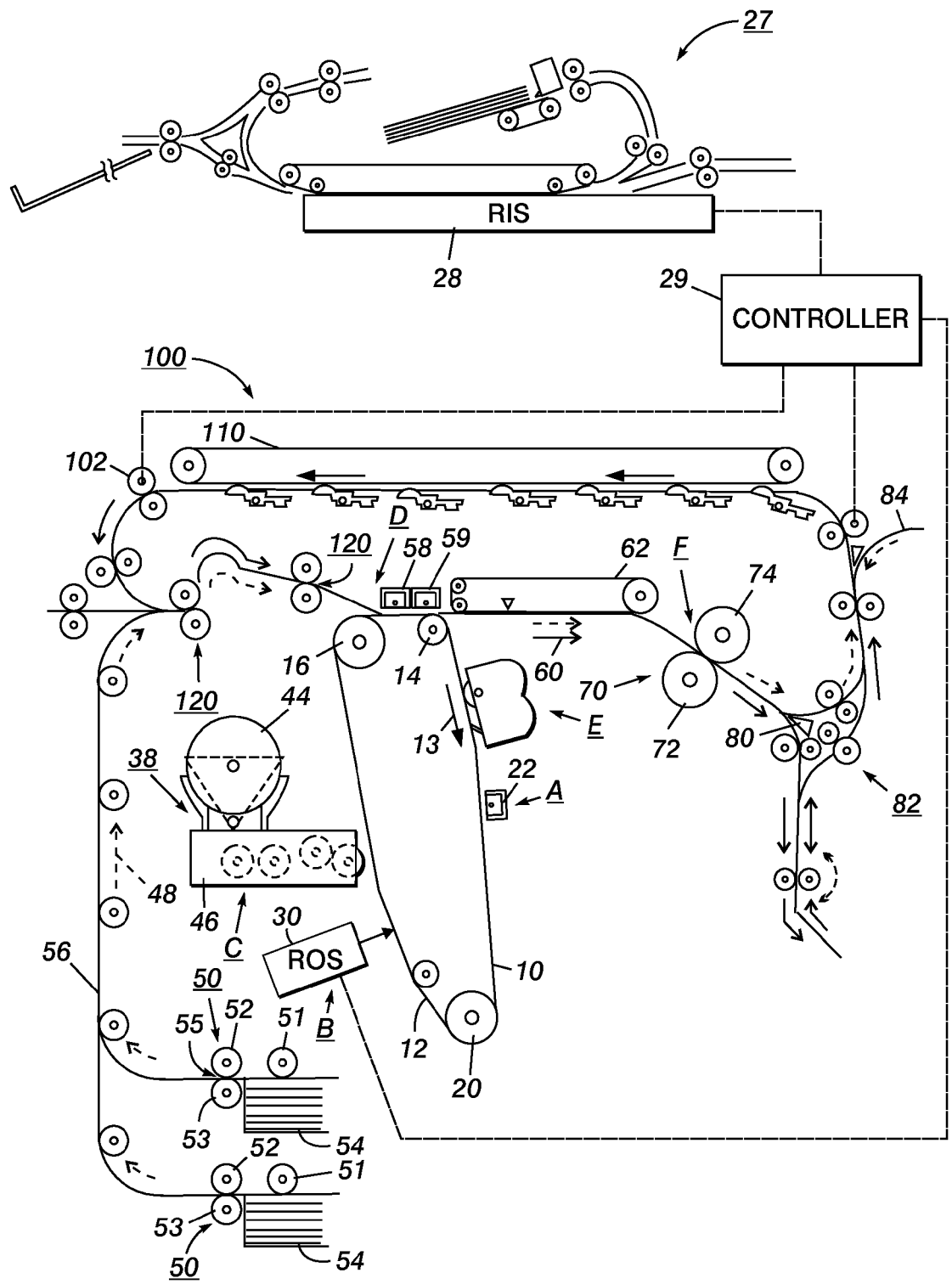
FIG. 3 is a schematic diagram of a printing device according to embodiments herein.

Exemplary device/system embodiments are shown in schematic form in FIGS. 2 and 3. FIG. 2, discussed here, is a simplified device illustration, while FIG. 3, discussed below, is a more detailed device diagram. As shown in FIG. 2, a processor (such as a central processing unit (CPU)) 210 is included within the printing apparatus 200. An in-line spectrophotometer 212 that comprises an integral part of the printing apparatus 200 is operatively connected to the processor 210.

The in-line spectrophotometer 212 (potentially in response to instructions received through the user (or network) interface 208) scans the item that has the color feature to identify the item color. A computer-readable storage medium 214, which is also operatively connected to the processor 210, stores the item color as the custom target color. The computer-readable storage medium 214 can also store the custom target color with the print job for future reference. This allows the printing device 200 to send the print job and custom target color(s) to other similar printers to allow the job to be processed across multiple printers.

The printing apparatus 200 includes a printing engine 204 (again, operatively connected to the processor 210). The sheet path 216 of the printing apparatus 200 is also operatively connected to the processor 210. The sheet path 216 draws sheets from the sheet supply 202 to the printing engine 204. The printing engine 204 processes at least one print job to output at least one printed sheet. The sheet path 216 directs the printed sheet to the in-line spectrophotometer 212 to identify at least one printed color on the printed sheet.

The processor 210 compares the printed color(s) to the custom target color(s) to identify a color difference, and the processor 210 adjusts printing characteristics of the printing apparatus 200 to reduce such color difference. Once the printing apparatus 200 properly matches the custom target colors for a given print job, the print job is output to a sheet output (operatively connected to the end of the sheet path 216) that can comprise a tray or a finisher device (stapler, sorter, folder, bookmaker, etc.) 206.

As one example, to implement the foregoing, a customer accessible diagnostic could be provided to allow the customer to run the target sheet through the print engine (or just scan the image under the in-line spectrophotometer). When the color data has been successfully captured, the custom target color data can be locked in and stored away to be used in a future job. Thus, custom target colors can be saved and attached as an attribute of the job. This way, it can be remembered and reproduced at a later date if necessary.

While every color printer supplies a certain mix of base colors to comply with its own specific preset color targets, the embodiments herein differ from such processing because the embodiments herein dynamically set the custom color targets. Printing devices are calibrated to specific color targets by adjusting the operating parameters of the printer (internal surface temperatures, printing speed, electrical charge, color mix, etc.) so that the output matches the color targets. For example, it is common to use a mixture of cyan, magenta, yellow, and black (CMYK) inks and toners and to provide specific voltage charges to produce a spectrum of colors on printed sheets. However, because of the different operating characteristics the same "color" can appear differently when it is printed by different printers.

For example, a color sheet to be reproduced is usually scanned using a raster input scanner (RIS). This image is processed into electrical signals, which are converted into other signals and voltages to operate the different color printing elements within the printer. Because different printers are based on different designs and use different preset target colors, two different printers (different class, type, brand, etc. of printers) can scan the same sheet for color copying and produce colors that look different from each other (and potentially different from the original color sheet scanned in).

This occurs because each of the preset target colors is based on a wavelength range of what is considered acceptable. Each of these wavelength ranges is centered to define target colors that should work for a broad range of customers, but which may not be perfect for every situation. Therefore, the wavelength upon which these target colors are centered may not be closely aligned with the colors of a specific print job and this can cause the output to look different than the original. On the other hand, if a specific print job coincidentally contained colors that perfectly aligned with the target colors, the output would match the input perfectly. Thus, if different printers have the wavelength ranges centered differently, this can cause the printers to output prints that have different appearances. Further, depending upon how close the preset target colors of a given printing device coincidentally match the colors of a given print job, one printer may produce an excellent match, while another may not.

The wavelengths are eventually converted to how much CMYK (Cyan, Magenta, Yellow and Black) and/or RGB (Red, Green, Blue) are needed to render that wavelength of color. One analogy is going to a paint store to get custom paint. Conventional printers with color matching are can be analogized to get a pre-set custom color from one of the paint chips. For a given paint chip (e.g., Prairie Dawn), some would have predetermined that X amount of white with Y amount of black and Z amount of burnt sienna creates "Prairie Dawn" paint color. This is analogous to a print on the printer using preset targets to determine what the color red looks like on the print. One can manually tweak these targets to get another custom color. The embodiments herein are analogous to a paint store with a color matching machine that scans a swatch of fabric and the machine determines how much white, black, and burnt sienna are needed to match the color.

One implementation takes the customer image (or the image run on another machine) and scans a specific area of the image with a hand-held Spectrophotometer (let's say that the customer really likes the color purple on the sample image). The electronic original of the image is then loaded into the digital front end of the printer. The operator goes to the pantone editor and selects the same area of the image that was scanned and tags that color as pantone XYZ. The pantone editor then applies the values read by the Spectrophotometer to pantone XYZ. From this point, one could run the image and see if it needs to be tweaked. Once one is are satisfied with the color, they can run the final job.

Because the embodiments herein define custom target colors that can be specific to each different print job, the wavelength ranges can be centered on new wavelengths that precisely match the wavelengths of the colors identified by the in-line spectrophotometer for a specific print job. Therefore, because the embodiments herein define custom target colors to which the printer is calibrated, the printed output will match the scanned image more closely than if the preset target colors are used (unless the preset target colors happen to coincidentally exactly match the target colors needed for a given print job, at which point the performance will be similar for the preset target colors).

Further, embodiments herein can narrow the wavelength ranges of the custom target colors (relative to the wavelength ranges of the preset target colors). The preset target colors may be evenly spread across the available color spectrum of a given printer to allow the printer broad application to different users and different print jobs and to maintain the calibration operation within cost-justified boundaries. However, because the present embodiments create custom target colors for each print job, the target colors can be unequally spread across the available printing spectrum of the printer. Thus, for example, if a print job is focused on a narrow band of wavelengths, the embodiments herein could define many custom target colors within that narrow band of wavelengths and provide relatively fewer custom target colors in other wavelengths. This would not increase the overhead of the calibration operation, but would allow more granularity within a narrow band of wavelengths (more narrow band of custom target colors).

The word "printer" or "image output terminal" as used herein encompasses any apparatus, such as a digital copier, bookmaking machine, facsimile machine, multi-function machine, etc. which performs a print outputting function for any purpose. The embodiments herein specifically applied to electrostatic and xerographic devices. The details of printers, printing engines, etc. are well-known by those ordinarily skilled in the art and are discussed in, for example, U.S. Pat. No. 6,032,004, the complete disclosure of which is fully incorporated herein by reference.

For example, FIG. 3 schematically depicts an electrophotographic printing machine that is similar to one described in U.S. Pat. No. 6,032,004. It will become evident from the following discussion that the present embodiments may be employed in a wide variety of devices and is not specifically limited in its application to the particular embodiment depicted in FIG. 3. Referring to FIG. 3, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 3 schematically illustrates an electrophotographic printing machine which generally employs a photoconductive belt 10. The photoconductive belt 10 can be made from a photoconductive material coated on a ground layer, which, in turn, can be coated on an anti-curl backing layer. Belt 10 moves in the direction of arrow 13 to advance successive portions sequentially through the various processing stations disposed about the path of movement thereof. Belt 10 can be entrained about stripping roller 14, tensioning roller 16 and drive roller 20. As roller 20 rotates, it advances belt 10 in the direction of arrow 13. Tensioning roller 16 can be biased, and provides motion control.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which can be transmitted to a modulated output generator, for example the raster output scanner (ROS), indicated generally by reference numeral 30. The ESS 29 can be a self-contained, dedicated minicomputer. The image signals transmitted to ESS 29 may originate from a RIS as described above or from a computer, thereby enabling the electrophotographic printing machine to serve as a remotely located printer for one or more computers.

Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 3, after the electrostatic latent image is developed, the toner powder image present on belt 10 advances to transfer station D. A print sheet 48 can be advanced to the transfer station, D, by a sheet feeding apparatus, 50. The sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D.

Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. The fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll can be internally heated by a quartz lamp (not shown). Release agent, stored in a reservoir (not shown), can be pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller 29 can be a programmable microprocessor which controls all machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock, Tex., USA, and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A method comprising:

scanning an item having at least one color feature using an in-line spectrophotometer of a printing apparatus to identify at least one item color of said item;

storing said at least one item color as at least one custom target color in a computer-readable storage medium of said printing apparatus, said custom target color being different than preset target colors of said printing apparatus initially established during design of said printing apparatus;

processing at least one print job through a printing engine of said printing apparatus to output at least one printed sheet;

scanning said printed sheet with said in-line spectrophotometer to identify at least one printed color on said printed sheet;

comparing said printed color to said custom target color to identify a color difference;

adjusting printing characteristics of said printing apparatus to reduce said color difference;

outputting said print job; and storing said custom target color with said print job for future reference.

2. The method according to claim 1, said item being produced by a different type of printing apparatus than said printing apparatus.

3. The method according to claim 1, said comparing causing said printing apparatus to conform to said custom target color and to ignore said preset target colors.

4. A method comprising:

scanning an item having at least one color feature using an in-line spectrophotometer of a printing apparatus to identify at least one item color of said item;

storing said at least one item color as at least one custom target color in a computer-readable storage medium of said printing apparatus, said custom target color being different than preset target colors of said printing apparatus initially established during design of said printing apparatus;

processing at least one print job through a printing engine of said printing apparatus to output at least one printed sheet;

during said processing of said print job, scanning said printed sheet with said in-line spectrophotometer to identify at least one printed color on said printed sheet;

during said processing of said print job, comparing said printed color to said custom target color to identify a color difference;

during said processing of said print job, adjusting printing characteristics of said printing apparatus to reduce said color difference;

outputting said print job; and storing said custom target color with said print job for future reference.

5. The method according to claim 4, said item being produced by a different type of printing apparatus than said printing apparatus.

6. The method according to claim 4, said comparing causing said printing apparatus to conform to said custom target color and to ignore said preset target colors.

7. A printing apparatus comprising:

a processor within said printing apparatus;

an in-line spectrophotometer operatively connected to said processor, said in-line spectrophotometer scanning an item having at least one color feature to identify at least one item color of said item;

a computer-readable storage medium operatively connected to said processor, said computer-readable storage medium storing said at least one item color as at least one custom target color, said custom target color being different than preset target colors of said printing apparatus initially established during design of said printing apparatus;

a printing engine operatively connected to said processor, said printing engine processing at least one print job to output at least one printed sheet;

a sheet path operatively connected to said processor, said sheet path directing said printed sheet to said in-line spectrophotometer to identify at least one printed color on said printed sheet, said processor comparing said printed color to said custom target color to identify a color difference, and said processor adjusting printing characteristics of said printing apparatus to reduce said color difference;

a sheet output operatively connected to said sheet path; and a computer-readable storage medium storage medium storing said custom target color with said print job for future reference.

8. The printing apparatus according to claim 7, said item being produced by a different type of printing apparatus than said printing apparatus.

9. The printing apparatus according to claim 7, said comparing causing said printing apparatus to conform to said custom target color and to ignore said preset target colors.

10. A printing apparatus comprising:

a processor within said printing apparatus;

an in-line spectrophotometer comprising an integral part of said printing apparatus and being operatively connected to said processor, said in-line spectrophotometer scanning an item having at least one color feature to identify at least one item color of said item;

a computer-readable storage medium operatively connected to said processor, said computer-readable storage medium storing said at least one item color as at least one custom target color, said custom target color being different than preset target colors of said printing apparatus initially established during design of said printing apparatus;

a printing engine operatively connected to said processor, said printing engine processing at least one print job to output at least one printed sheet;

a sheet path operatively connected to said processor, said sheet path directing said printed sheet to said in-line spectrophotometer to identify at least one printed color on said printed sheet, said processor comparing said printed color to said custom target color to identify a color difference, and said processor adjusting printing characteristics of said printing apparatus to reduce said color difference;

a sheet output operatively connected to said sheet path; and a computer-readable storage medium storage medium storing said custom target color with said print job for future reference.

11. The printing apparatus according to claim 10, said item being produced by a different type of printing apparatus than said printing apparatus.

12. The printing apparatus according to claim 10, said comparing causing said printing apparatus to conform to said custom target color and to ignore said preset target colors.

* * * * *